United States Patent [19]

Tsuyuguchi

[11] 4,321,635
[45] Mar. 23, 1982

[54] APPARATUS FOR SELECTIVE RETRIEVAL OF INFORMATION STREAMS OR ITEMS

[75] Inventor: Hiroshi Tsuyuguchi, Tokyo, Japan

[73] Assignee: Teac Corporation, Tokyo, Japan

[21] Appl. No.: 31,950

[22] Filed: Apr. 20, 1979

[51] Int. Cl.³ .................... G11B 27/28; G11B 17/00; G11B 15/00

[52] U.S. Cl. ................................ 360/72.2; 360/72.1; 360/74.4; 369/25; 369/28

[58] Field of Search .................... 360/72.2, 72.1, 73, 360/74.4, 97–99, 93, 71; 179/100.1 VC, 100.1 PS; 369/25, 28; 358/127, 128.5, 130–132; 353/25, 26 A, 27 A

[56] References Cited

U.S. PATENT DOCUMENTS

| | | | |
|---|---|---|---|
| 3,490,013 | 1/1970 | Lawrance et al. | 360/39 |
| 3,530,258 | 9/1970 | Gregg et al. | 360/77 |
| 3,573,360 | 4/1971 | Rose, Jr. | 360/72.2 |
| 3,660,616 | 5/1972 | Davidge et al. | 360/72.2 |
| 3,804,993 | 4/1974 | Honnold et al. | 179/100.1 PS |
| 3,809,302 | 5/1974 | Malyon | 360/72.1 |
| 3,931,457 | 1/1976 | Mes | 360/72.2 |
| 4,000,518 | 12/1976 | Stearns | 179/100.1 PS |
| 4,135,058 | 1/1979 | Pfost et al. | 179/100.1 VC |
| 4,237,497 | 12/1980 | Trevithick | 360/72.1 |

*Primary Examiner*—Alfred H. Eddleman
*Attorney, Agent, or Firm*—Woodcock, Washburn, Kurtz, Mackiewicz & Norris

[57] ABSTRACT

A video disc player for use with a record disc having recorded along a spiral track thereon a succession of information streams to be reproduced and a series of addresses identifying the successive turns of the track. Also recorded on the record disc, prior to the information streams, is an index listing at least the starting addresses of the information streams. An optical pickup assembly reads the record disc by traveling in its radial direction in step with the rotation of the disc. A memory stores the index read from the record disc and, upon actuation of one of information selector switches by the operator, delivers the starting address of the selected information stream to a comparator circuit. During the subsequent process of access to the selected information stream, perhaps with the pickup assembly fed at high speed toward same, the comparator circuit receives another input representing that address on the record disc which corresponds to the position of the pickup assembly relative to the disc. Upon agreement of the two inputs the comparator circuit produces an output for stopping the radial motion of the pickup assembly or for switching its radial motion from high to normal speed. The invention is further applicable to a tape cassette player, as also disclosed herein, and to other comparable devices.

12 Claims, 19 Drawing Figures

FIG. 2
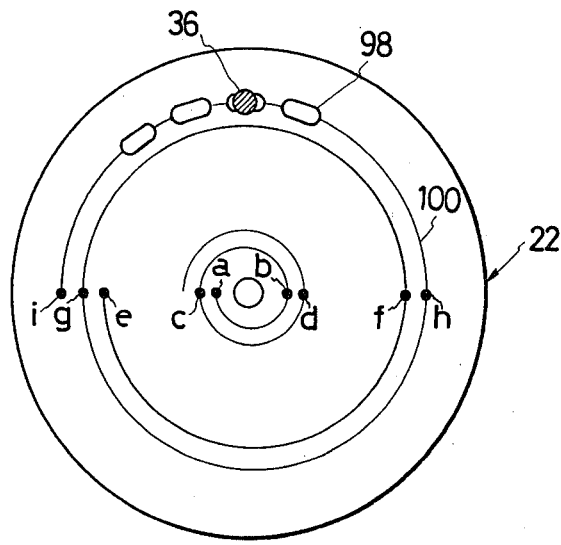
FIG. 3
| ADDRESS 0 | ADDRESS 100 | ADDRESS 200 | ADDRESS 300 | ADDRESS 400 |
|---|---|---|---|---|
| INDEX | FIRST INFO STREAM | SECOND INFO STREAM | THIRD INFO STREAM | |
FIG. 5
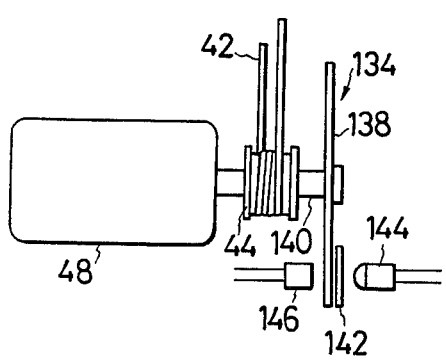
FIG. 6
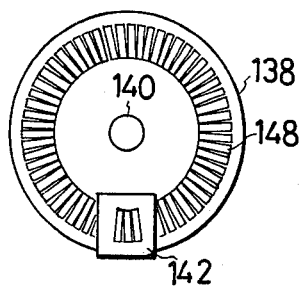
FIG. 7

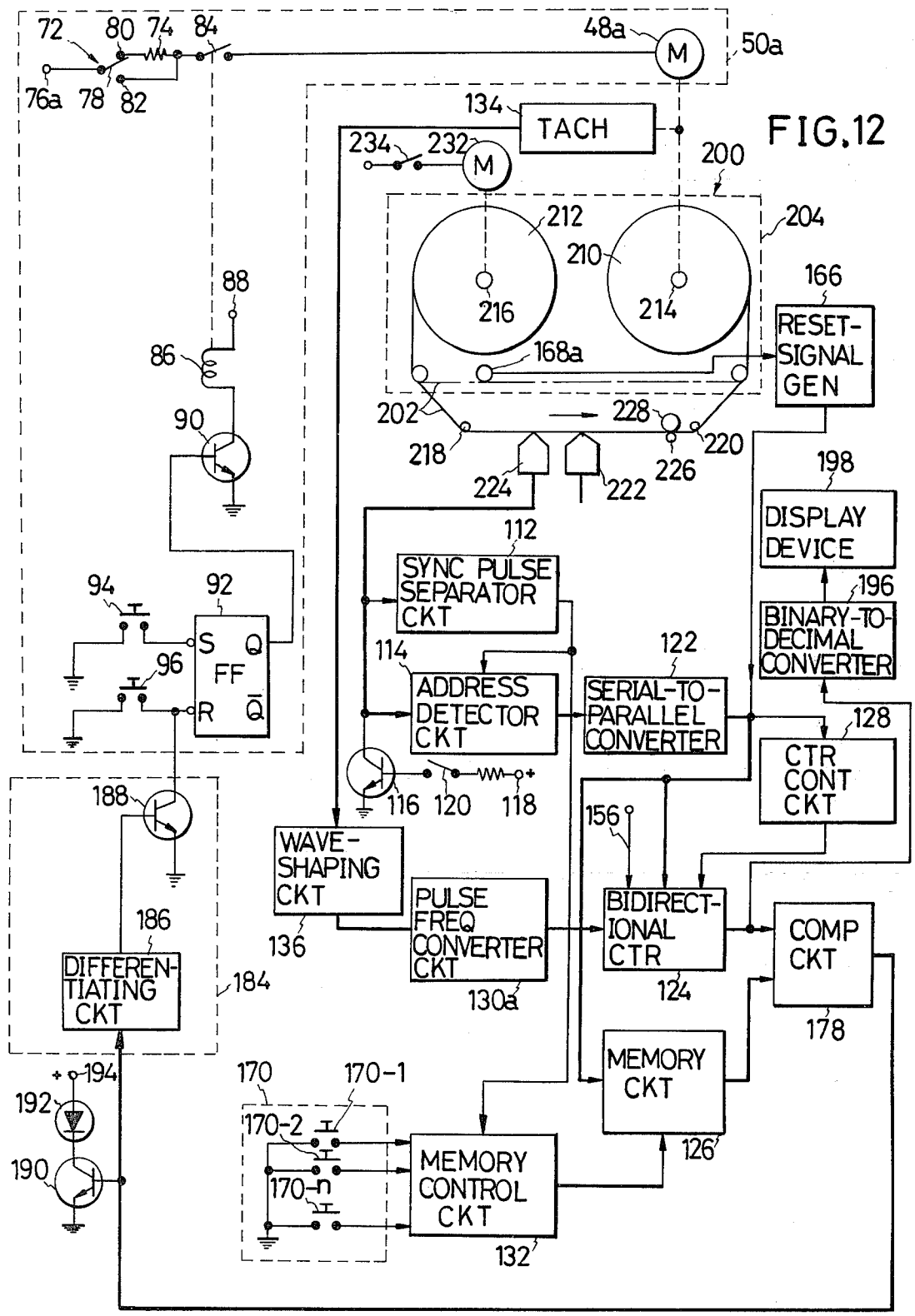

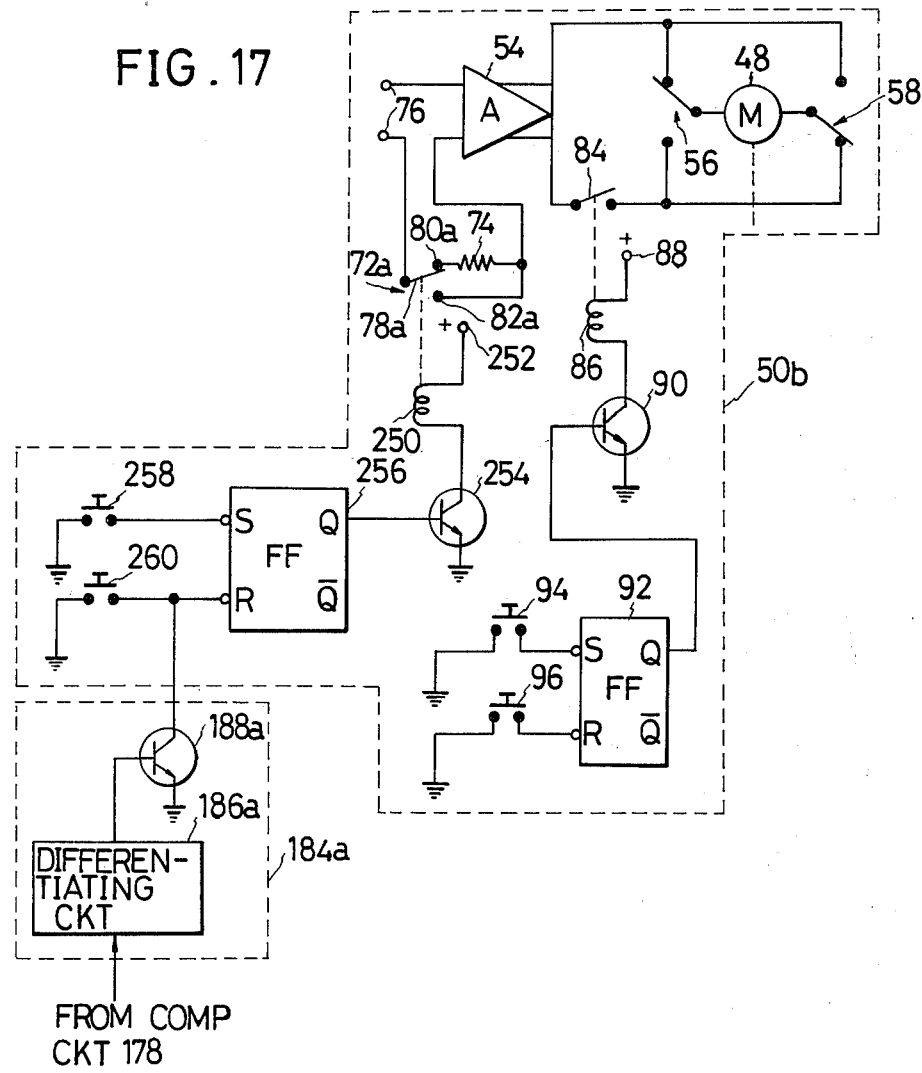
FIG. 17
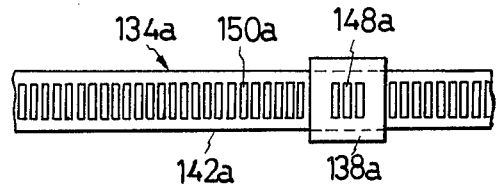
FIG. 18
FIG. 19

APPARATUS FOR SELECTIVE RETRIEVAL OF INFORMATION STREAMS OR ITEMS

BACKGROUND OF THE INVENTION

1. Field of the Invention

My invention pertains to apparatus for the reproduction of information, particularly video and/or audio information, with or without means for recording. More particularly my invention concerns such apparatus well adapted for selective retrieval of a plurality or multiplicity of information streams or items recorded successively on one and the same record medium, permitting ready access to any desired one of the information streams or items. The record medium may be in the form of a disc, magnetic tape, etc.

2. Description of the Prior Art

The video disc player, as of the Philips-MCA type, represents one of the typical applications of my invention. The principles of the video disc player apply also to the recording and playback of audio information by the pulse code modulation (PCM) scheme. The record disc for use with such video and/or audio disc players bears information in the form of a succession of short grooves or "pits" inscribed along a multiturn spiral track.

For reading the record disc the disc player usually has an optical pickup assembly comprising a light source such as a helium-neon (He-Ne) laser or semiconductor laser, an objective or collector lens for focusing the laser beam on the record disc, and a photodetector for translating into an electrical signal the information-modulated laser beam that has been reflected from the record disc. The rotation of the record disc about its own axis and the linear motion of the pickup assembly in the radial direction of the disc combine to enable the scanning laser beam to follow the spiral track on the disc.

Although the record disc may have a single stream of information recorded from the start to end of its track, it is also possible to record a plurality or multiplicity of streams or blocks of information one after the other along the track. In this latter case it will be convenient for the user if the disc player permits the playback of the information streams in a random, as well as serial, order.

One well known method for the selective retrieval of the information streams from the record disc utilizes a series of addresses also recorded on the disc, during the vertical retrace intervals of the composite picture signal to be reproduced. Let it be assumed that the operator wishes to retrieve, according to this conventional method, the third of the successive information streams on the record disc. He must know, first of all, the address of the starting point of the third information stream on the record disc. If the third information stream starts from address 100, for example, then the operator may input address 100 by means of the keyboard of the disc player system.

During the subsequent process of locating the third information stream on the record disc, the optical pickup assembly scans its track at normal speed, reading the successive addresses thereon and delivering an address-representing output signal to a comparator circuit. The other input to this comparator circuit is the keyboard-specified address 100. When the pickup assembly reads address 100 on the record disc, therefore, the comparator circuit produces an output either for suspending the relative scanning motion of the record disc and the pickup assembly or for starting the playback of the third information stream.

An objection to this prior art information retrieval system resides in the trouble involved in inputting the starting address of each desired information stream through the keyboard. As the number of digits making up the starting address of each information stream increases, the operator must depress the correspondingly increased number of keys.

In order to overcome the above objection it may be contemplated to provide a set of information selector switches corresponding to the respective information streams to be reproduced. The information retrieval system may be present so that upon actuation of any one information selector switch, the comparator circuit may receive a signal representing the starting address of the selected information stream.

This alternative is also objectionable, however, because the starting addresses of information streams may differ from disc to disc. For example, while the third information stream may start from address 100 on one record disc, it may start from address 200 on another. Thus a different set of the starting addresses of information streams must be preset on the information retrieval system for each record disc to be read.

The above problems hold with various other types of apparatus for the reproduction of information. One example is a magnetic tape record-playback device equipped to permit selective retrieval of information streams prerecorded one after the other along the length of magnetic tape.

SUMMARY OF THE INVENTION

It is an object of my invention to provide information reproducing apparatus with improved, easy-to-operate means for automatically locating, or gaining access to, any desired one of a plurality or multiplicity of information streams or items recorded successively on a record medium.

Another object of my invention is to provide such apparatus permitting access to any desired one of the information streams or items at normal and/or high speed.

A further object of my invention is to provide such apparatus permitting ready access to any of the successive information streams or items which may be recorded in different locations on different record media.

A still further object of my invention is to provide an improved information retrieval system adaptable for a wide variety of existing information reproducing apparatus such as, for instance, video and/or audio disc players and magnetic tape record-playback devices.

Stated in its perhaps broadest aspect, the apparatus according to my invention includes, or presupposes the use of, a record medium having a succession of information streams or items recorded along at least one track thereon. Also recorded on the record medium, prior to the information streams to be read out, is an index to the information streams, listing at least their locations on the record medium. Thus, as the apparatus starts the playback of the record medium, the index to the subsequently recorded information streams is first recovered therefrom and written in suitable storage means. When the operator or user selects any one of the information streams to be reproduced, as by actuating the corresponding one of a set of information selector switches, the storage means delivers to comparator means a signal representing the location of the selected information stream. The apparatus further includes means for detecting the relative positional relationship between the record medium and means for reading same. The detecting means also delivers to the comparator means an output signal representing the relative positional relationship between the record medium and the reading means. Upon agreement of the two input signals the comparator means produces an output signal for controlling the relative motion between the record medium and the reading means.

The above summarized apparatus according to my invention materially lessens the trouble heretofore imposed on the operator in retrieving any desired one of a succession of information streams from a record medium. Since the index to the available information streams, listing for example the addresses of their starting points on the record medium, is first written in the storage means with the start of the reading of the record medium, all that the operator is required to do in selecting one of the information streams is, for example, to actuate one of the information selector switches corresponding to his selection.

Let it be supposed that the operator wishes the reproduction of the third of the successive information streams, and that this third information stream starts from address 300 of the record medium. He may then actuate the third information selector switch, whereupon the storage means delivers to the comparator means the output signal representing the starting address 300 of the third information stream. He need not specify the starting address 300 of the third information stream, nor is he even required to know that the third information stream starts from address 300. Further, even if the third information stream on another record medium starts from address 400, for example, he may also actuate the third information selector switch for the retrieval of the third information stream from that record medium.

The apparatus according to my invention further features high and/or normal speed access to any selected information stream. This feature may be explained in terms of an optical disc player embodying my invention, for use with a record disc having a succession of information streams recorded along a spiral track thereon.

The disc player includes an optical pickup assembly movable radially of the record disc, in step with the rotation of the latter, to follow the spiral track thereon. For high speed access to any selected information stream the pickup assembly is fed at high speed, and in this case the noted detecting means derives its address-representing output signal from a train of pulses representing the radial motion of the pickup assembly relative to the record disc. During normal speed access to the selected information stream, on the other hand, the detecting means derives the address-representing output signal directly from the addresses read successively from the record disc by the pickup assembly. The detecting means is further adapted to produce the proper address-representing signal even if the radial motion of the pickup assembly is switched from high to normal speed, or vice versa, during access to the desired information stream.

The above and other features, advantages and objects of my invention and the manner of attaining them will become more readily apparent, and the invention itself will best be understood, from the following description of several preferred embodiments and the appended claims taken in connection with the accompanying drawings.

BRIEF DESCRIPTION OF THE DRAWINGS

FIG. 2 is a schematic plan view of the record disc for use with the disc player of FIG. 1, the view showing for simplicity only a few of the numerous pits inscribed on the record disc along a spiral track, with the few representative pits being shown greatly exaggerated with respect to the record disc itself;

FIG. 3 shows schematically the arrangements of the information streams, and the index thereto, along the track on the record disc of FIG. 2;

FIG. 5 is an elevational view of the tachometer used in the disc player of FIG. 1;

FIG. 6 is an elevational view of the slitted disc and slitted plate in the tachometer of FIG. 5, the disc and plate being shown in their relative working positions as seen from the right hand side in FIG. 5;

FIG. 7 is an elevational view of the slitted plate of FIG. 6;

FIG. 12 is a schematic diagram, partly in block form, of magnetic tape cassette record-playback apparatus also embodying my invention, the apparatus incorporating means for automatically locating any of a succession of information streams recorded along the length of magnetic tape;

FIG. 17 is a schematic diagram of a modification of the radial feed motor control circuit in the disc player of FIG. 1;

FIG. 18 is an elevational view of a modification of the tachometer of FIGS. 5, 6 and 7; and FIG. 19 is a top plan view of the modified tachometer of FIG. 18.

DESCRIPTION OF THE PREFERRED EMBODIMENTS

Figure 1:
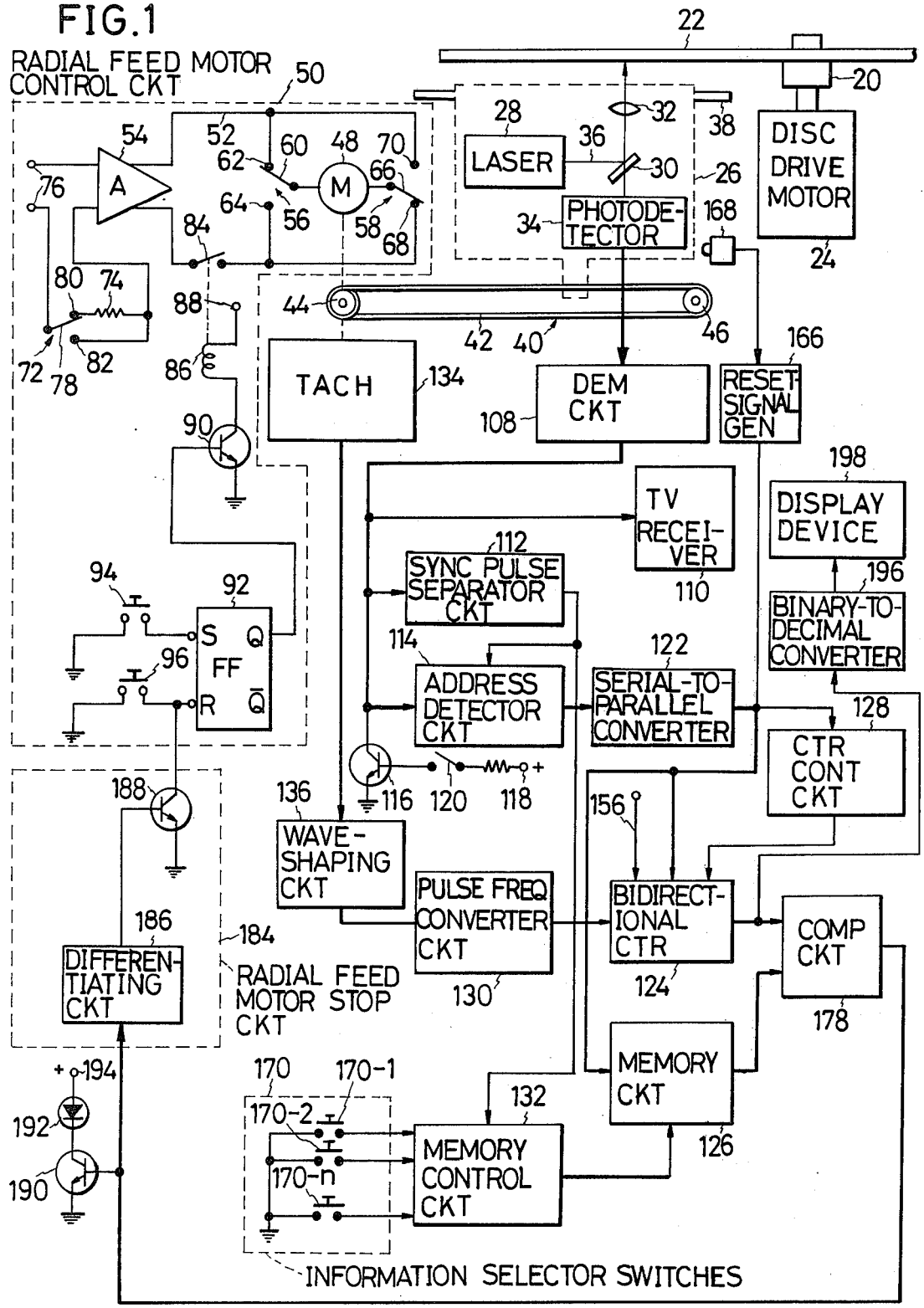
FIG. 1 is a schematic diagram, partly in block form, of a video disc player embodying my invention, the disc player incorporating means for automatically locating any of a succession of video information streams recorded on a record disc.

FIG. 1 of the above drawings shows my invention as adapted, by way of example only, for what is commonly known as a video disc player. The disc player employs as the record medium a disc carrying video information, with or without audio information, in the form of a succession of pits inscribed along a multiturn spiral track. More detailed description of the record disc will later appear in connection with FIG. 2.

The disc player of FIG. 1 includes a turntable 20 of reduced diameter securely but replaceably holding the record disc 22 thereon. A disc drive 24 is coupled directly to the turntable 20 for driving same, and therefore the record disc 22 thereon, at a speed of, usually, 1800 revolutions per minute.

Enclosed within the dashed lines and generally designated 26 is an optical pickup assembly for optically scanning or reading the record disc 22 along its spiral information track and for translating the information into the corresponding electrical signals. Essentially the optical pickup assembly 26 comprises a light source such as a laser 28, a half-silvered mirror 30, an objective or collector lens 32, and a photodetector 34. Although FIG. 1 shows the pickup assembly 26 schematically, it will nevertheless be seen that the beam of light 36 emitted by the laser 28 and subsequently reflected from the half-silvered mirror 30 is focused by the objective 32 on the record disc 22. On reflection from the record disc 22 the laser beam 36 travels back through the objective 32 and further through the half-silvered mirror 30 and thus falls on the photodetector 34. The laser beam 36 incident on the photodetector 34 has had its intensity modulated by the successive pits on the record disc 22. The electrical output from the photodetector 34, therefore, represents the information on the record disc 22.

The optical pickup assembly 26 of the above configuration is mounted on a suitable carriage, not shown, which is in sliding engagement with a guide rail or rails 38 extending radially of the record disc 22 on the turntable 20. The numeral 40 generally designates an example of mechanism for feeding the pickup assembly 26 back and forth along the guide rail 38.

The exemplified radial feed mechanism 40 comprises an endless wire 42 extending over a drive pulley 44 and an idler pulley 46. The drive pulley 44 is coupled to a direct-current motor 48 (hereinafter referred to as the radial feed motor). The unshown carriage of the pickup assembly 26 is secured to one of the flights of the endless wire 42, which extends parallel to the guide rail 38.

Thus, upon rotation of the radial feed motor 48, the pickup assembly 26 travels in either direction along the guide rail 38. During such linear travel of the pickup assembly 26 the disc drive motor 24 rotates the record disc 22 on the turntable 20 about its own axis. The pickup assembly 26 is thus enabled to scan the record disc 22 along its spiral information track with the laser beam 36.

Although the radial feed motor 48 as a mechanical component forms a part of the radial feed mechanism 40, this motor as an electrical component is shown to be incorporated in a radial feed motor control circuit 50 to facilitate illustration. This motor control circuit functions (1) to change the direction of rotation of the radial feed motor 48, thereby changing the traveling direction of the pickup assembly 26 along the guide rail 38, (2) to switch the radial feed motor between low (normal) and high speed rotation, and (3) to make the on-off control of the radial feed motor. More detailed description of the radial feed motor control circuit 50 follows.

The radial feed motor 48 is connected via a feed circuit 52 to a drive amplifier 54. The feed circuit 52 has a first 56 and a second 58 direction selector switch for changing the rotational direction of the radial feed motor 48. The first direction selector switch 56 comprises a movable contact 60 and two fixed contacts 62 and 64. The second direction selector switch 58 likewise comprises a movable contact 66 and two fixed contacts 68 and 70.

FIG. 1 shows the movable contact 60 of the first direction selector switch 56 in engagement with the fixed contact 62 and the movable contact 66 of the second direction selector switch 58 in engagement with the fixed contact 68. The radial feed motor 48 is then conditioned for rotation in a forward direction, such that the pickup assembly 26 will travel leftwardly, as viewed in FIG. 1, or outwardly of the record disc 22. Contrarily, when the first selector switch movable contact 60 is in engagement with the fixed contact 64, and the second selector switch movable contact 66 in engagement with the fixed contact 70, the radial feed motor 48 is conditioned for rotation in a reverse direction. The pickup assembly 26 will then travel rightwardly or inwardly of the record disc 22.

A speed selector switch 72 and resistor 74 are connected between drive amplifier 54 and pair of supply terminals 76 in order to change the rotational speed of the radial feed motor 48. The speed selector switch 72 comprises a movable contact 78 connected to one of the input terminals 76, a first fixed contact 80 connected to the drive amplifier 54 via the resistor 74, and a second fixed contact 82 connected directly to the drive amplifier.

When the movable contact 78 of the speed selector switch 72 is engaged with the first fixed contact 80 as shown, one of the supply terminals 76 is connected to the drive amplifier 54 via the resistor 74. This resistor functions to reduce the input level of the drive amplifier 54. The radial feed motor 48 is therefore conditioned to drive the pickup assembly 26 at low or normal speed. Upon engagement of the movable contact 78 with the second fixed contact 82 the input level of the drive amplifier 54 increases, so that the radial feed motor 48 is conditioned to drive the pickup assembly 26 at high speed.

The feed circuit 52 of the radial feed motor 48 further includes a pair of relay contacts 84 that are closed or opened in response to the energization or deenergization of a relay coil 86. This relay coil has one of its extremities connected to a supply terminal 88 and the other extremity to the collector of an NPN-type switching transistor 90. The emitter of the transistor 90 is grounded. Consequently the relay coil 86 is energized to close the relay contact pair 84 only during conduction of the switching transistor 90.

Connected to the base of the switching transistor 90 is a flip-flop 92 for switching same. The flip-flop 92 has its set terminal S grounded via a radial feed motor start switch 94 of the normally open type, and its reset terminal R grounded via a radial feed motor stop switch 96, also of the normally open type. These switches 94 and 96 are to be actuated manually to set the radial feed motor 48 in and out of rotation. The circuit components so far described and shown enclosed within the dashed lines in FIG. 1 constitute in combination the radial feed motor control circuit 50.

The combination of the above described disc drive motor 24, optical pickup assembly 26, radial feed mechanism 40, and radial feed motor control circuit 50 enables the disc player to read the record disc 22 on the turntable 20. The disc player in accordance with my invention is further equipped with means for enabling the user to gain ready access to any desired one of the information streams recorded on the record disc 22. Prior to the description of such information retrieval means, however, I will briefly explain the record disc 22 for use with the disc player in order to facilitate the subsequent description of the information retrieval means.

With reference to FIG. 2 the record disc 22 has a frequency-modulated picture signal recorded thereon in the form of a succession of pits 98 arranged along a multiturn spiral track 100. Each pit 98 has a width of about one micron, a length of about 1.5 to 6 microns, and a depth of about one fourth of the wavelength of the scanning laser beam 36 in use. In this particular embodiment of my invention the television picture signal is recorded on the record disc 22 in such a way that each turn of the spiral track 100 corresponds to one picture frame. Each frame consists of, for example, two fields for interlaced scanning. Thus each half-turn of the track 100 corresponds to one field.

The record disc 22 has also recorded thereon the addresses of the respective turns of the information track 100. Since each half-turn of the track corresponds as aforesaid to one field in this particular embodiment, each track turn has two field flyback or vertical retrace regions, as at a through i in FIG. 2, during the scanning of which the television picture is blanked. The track turn addresses are recorded in every other one of these field flyback regions a through i.

FIG. 3 explains the information recorded on the record disc 22. Recorded first of all in the spiral track 100 on the record disc is a visual index, accompanied by a digital address index, to all the information streams recorded thereon, followed by the first, second, third, . . . information streams occupying the successive lengths of the track. The visual index may last from address 0 to address 99, the first information stream from address 100 to address 199, the second information stream from address 200 to address 299, the third information stream from address 300 to address 399, and so forth.

The visual index to the information streams may be a visual summary of the contents of the record disc 22. If the subject of the information streams on this particular record disc is human anatomy, for example, then the television screen may display, during the playback of the visual index, a human head to represent the first information stream, a human hand to represent the second information stream, a human leg to represent the third information stream, etc. Preferably the visual index may also include the serial numbers assigned to the successive information streams, rather than the starting addresses thereof, for purposes hereinafter made apparent.

The address index to the information streams, on the other hand, is not visually reproducible, being recorded in the form of a digital signal along with the synchronizing pulses of the television picture signal. In this particular embodiment the address index is a list of the starting addresses of the information streams. If these information streams are recorded as in FIG. 3, then the address index sequentially lists address 100 from which the first information stream starts, address 200 from which the second information stream starts, address 300 from which the third information stream starts, and so forth.

Figure 4:
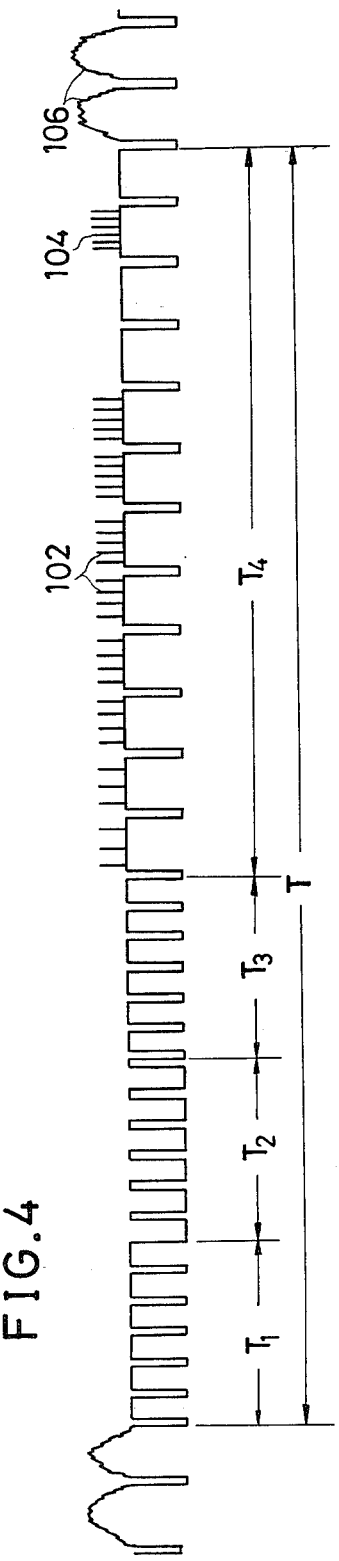
FIG. 4 is a waveform diagram of the composite picture signal recorded on the record disc of FIG. 2, the diagram showing in particular the various pulses and the address and index signals recorded during one of the vertical blanking sections of the picture signal.

FIG. 4 is a more detailed representation of the signals recorded on the record disc 22. The letter T in this figure denotes one of the vertical retrace sections of the National Television System Committee (NTSC) composite picture signal. The vertical retrace section T consists of an equalizing pulse subsection T1, a vertical blanking pulse subsection T2, another equalizing pulse subsection T3, and a horizontal synchronizing pulse subsection T4.

The address index to the information streams is recorded in the form of a binary digital signal 102 in the horizontal synchronizing pulse subsection T4. The address index signal 102 may sequentially provide a binary "1100100" to represent the starting address of the first information stream, "11001000" to represent the starting address 200 of the second information stream, "100101100" to represent the starting address 300 of the third information stream, etc. This address index signal 102 may be recorded in only the foremost one, or several foremost ones, of the successive vertical retrace sections of the composite picture signal, depending in part upon the total number of the starting addresses to be listed.

Also recorded in the horizontal synchronizing pulse subsection T4 of every other vertical retrace section is the address signal 104 identifying each turn of the spiral information track 100. The noted visual index is recorded at 106, during other than the vertical retrace regions from address 0 to address 99 of the track.

With reference back to FIG. 1 the photodetector 34 of the optical pickup assembly 26 has its output connected to a demodulator circuit 108. The photodetector 34 of the pickup assembly 26 puts out the FM signal representing the pattern of pits 98 on the record disc 22. The demodulator circuit 108 translates this FM signal into an amplitude-modulated (AM) signal and thus provides the composite picture signal (including the address index and address signals) such as that shown in FIG. 4. The output of the demodulator circuit 108 is connected to a television receiver 110, to a synchronizing pulse separator circuit 112, to an address detector circuit 114, and to a switching transistor 116.

The television receiver 110, which may be of familiar make, visually displays the information streams, as well as the visual index thereto, retrieved from the record disc 22. The synchronizing pulse separator circuit 112 separates from the composite picture signal the vertical synchronizing pulses, horizontal synchronizing pulses, and equalizing pulses such as those shown in FIG. 4.

The output of the synchronizing pulse separator circuit 112 is connected to the control input of the address detector circuit 114. Thus, under the control of the synchronizing pulses put out by the circuit 112, the address detector circuit 114 separates from the composite picture signal the address index signal such as that shown at 102 in FIG. 4 and the track turn address signal such as that shown at 104 in the same figure.

The switching transistor 116 has its collector connected to the output of the demodulator circuit 108, its emitter grounded, and its base connected to a supply terminal 118 via a normally open cutoff switch 120. This cutoff switch is to be automatically closed when the radial feed motor 48 is conditioned for rotation at high speed. Upon closure of the cutoff switch 120 the transistor 116 is rendered conductive to suspend the delivery of the output from the demodulator circuit 108 to the various components connected thereto.

The output of the address detector circuit 114 is connected to a serial-to-parallel converter 122. This converter converts the output from the address detector circuit 114 from serial to parallel format. The output of the serial-to-parallel converter 122 is connected to a bidirectional or forward-backward counter 124, to a memory circuit 126, and to a counter control circuit 128. A pulse frequency converter circuit 130 is connected to another input of the bidirectional counter 124.

The output of the counter control circuit 128 is connected to a control input of the bidirectional counter 124. During the normal speed travel of the optical pickup assembly 26 the counter control circuit 128 functions to prevent the delivery of the detected addresses of the successive track turns from the serial-to-parallel converter 122 to the bidirectional counter 124 upon sensing dropout errors therein. The counter control circuit 128 also prevents the delivery of the output from the serial-to-parallel converter 122 to the bidirectional counter 124 during the high speed travel of the pickup assembly 26.

In other words, during the travel of the pickup assembly 26 at normal speed, and when the detected track turn address signal has no parity error, the counter control circuit 128 permits the delivery of the output (i.e., the track turn address signal) from the serial-to-parallel converter 122 to the bidirectional counter 124, rather than the output from the pulse frequency converter circuit 130. During the travel of the pickup assembly 26 at high speed, or upon sensing a parity error in the detected track turn address signal during the normal speed travel of the pickup assembly, on the other hand, the counter control circuit 128 permits the output from the pulse frequency converter circuit 130 to enter the bidirectional counter 124, intercepting the inputting of the output from the serial-to-parallel converter 122.

Connected to the control input of the memory circuit 126 is a memory control circuit 132, to which there is connected the output of the synchronizing pulse separator 112. The address index to the information streams is to be written in the memory circuit 126 under the control of the memory control circuit 132, during the periods of time determined by the synchronizing pulses that have been recorded with the address index.

As has been mentioned, the bidirectional counter 124 receives not only the detected track turn addresses from the serial-to-parallel converter 122 but also, during the inputting of the control signal from the counter control circuit 128, a train of pulses corresponding to the revolutions of the record disc 22 on the turntable 20, from the noted pulse frequency converter circuit 130. This train of pulses will hereinafter be referred to as the disc revolution pulses.

The bidirectional counter 124 utilizes these disc revolution pulses, instead of the track turn addresses when they are not available, for ascertaining the radial position of the pickup assembly 26 relative to the record disc 22, as will become better understood as the description progresses. Employed for generating the disc revolution pulses are a tachometer 134 associated with the drive pulley 44 of the radial feed mechanism 40, a wave-shaping circuit 136 connected to the output of the tachometer, and the pulse frequency converter circuit 130 connected to the output of the wave-shaping circuit.

FIG. 5 shows the details of the tachometer 134. This tachometer comprises a rotary, slitted disc 138 nonrotatably mounted on the shaft 140 of the drive pulley 44 for simultaneous rotation therewith, a stationary, slitted plate 142 disposed opposite to the slitted disc 138, a light source such as a light emitting diode (LED) 144 disposed on the same side of the slitted disc as the slitted plate 142, and a light sensitive element such as a phototransistor 146 on the opposite side of the slitted disc.

As better seen in FIG. 6, the slitted disc 138 has a multiplicity of slits 148 formed radially therein at constant spacings. FIG. 7 shows that the slitted plate 142 also has similar slits 150 formed therein. The slitted plate 142 is disposed in such a position relative to the slitted disc 138, and the slits 150 are so arranged therein, that the radial slits 148 in the disc in rotation successively move into registration with the slits 150. The LED 144 irradiates the phototransistor 146 through the slits 148 and 150 only when they are in registration.

Thus, with the rotation of the radial feed motor 48 at constant speed, the phototransistor 146 generates an electrical output in the form of a sine wave. The frequency of this phototransistor output corresponds to the speed of travel of the pickup assembly 26 in the radial direction of the record disc 22.

With reference again to FIG. 1 the phototransistor 146 delivers its output to the wave-shaping circuit 136. This circuit may take the form of a Schmitt trigger and functions to convert the sine wave output from the phototransistor 146 into a rectangular wave. Connected next to the wave-shaping circuit 136, the pulse frequency converter circuit 130 in this particular embodiment takes the form of a frequency multiplier, serving to multiply the frequency or repetition rate of the input pulses.

The repetition rate of the disc revolution pulses put out by the pulse frequency converter circuit 130 is such that each pulse corresponds to one complete revolution of the record disc 22, that is, to one of the successive turns of its spiral information track 100 being traversed by the pickup assembly 26. As has been stated, the record disc 22 has the addresses of the respective turns of the information track 100 recorded in every other one of the field flyback regions a through i, FIG. 2, of the track. Each disc revolution pulse put out by the pulse frequency converter circuit 130 may therefore be considered to correspond, substantially to one of the track turn addresses.

In response to the disc revolution pulses from the pulse frequency converter circuit 130 the bidirectional counter 124 puts out a binary digital signal representative of the successive track turn addresses corresponding to the varying position of the pickup assembly 26 in the radial direction of the record disc 22. It has been mentioned that the counter control circuit 128 permits the disc revolution pulses from the pulse frequency converter circuit 130 to enter the bidirectional counter 124 only during the high speed travel of the pickup assembly 26 or in the event of the presence of a parity error in the track turn address signal detected actually by the address detector circuit 114 during the normal speed travel of the pickup assembly. Under other conditions the counter control circuit 128 permits the bidirectional counter 124 to receive the accurate track turn address signal from the serial-to-parallel converter 122.

Figure 8:
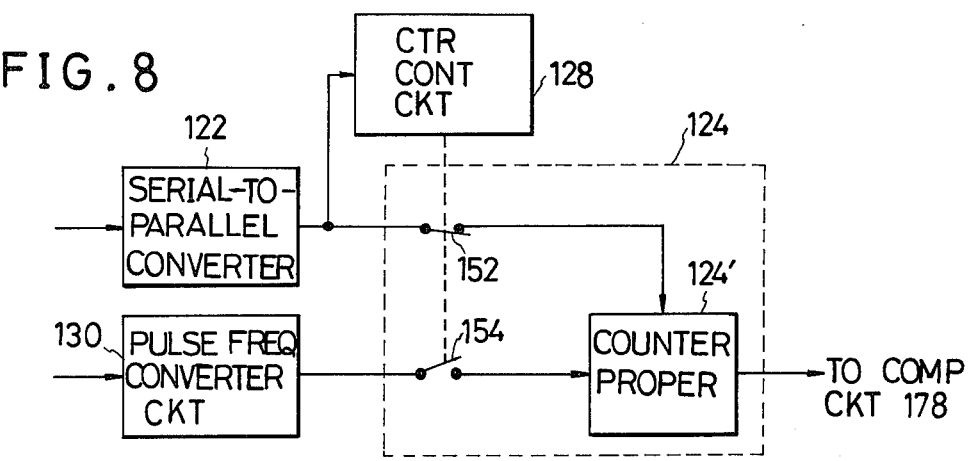
FIG. 8 is a block diagram explanatory of the input selecting function of the bidirectional counter used in the disc player of FIG. 1.

FIG. 8 schematically illustrates the above function of the counter control circuit 128. The reference numeral 124 in this figure generally designates the bidirectional counter which is shown to comprise a counter proper 124' and two input selector switches 152 and 154 actuated by the counter control circuit 128. The first input selector switch 152 is connected between serial-to-parallel converter 122 and counter proper 124', and the second input selector switch 154 is connected between pulse frequency converter circuit 130 and counter proper.

The first input selector switch 152 is held closed, and the second input selector switch 154 is held open, as long as the counter control circuit 128 produces no control signal. Normally, therefore, the counter proper 124' receives only the track turn address signal from the serial-to-parallel converter 122 via the first input selector switch 152, because the counter control circuit 128 produces the control signal only during the high speed travel of the pickup assembly 26 or upon sensing a parity error in any of the detected track turn addresses during the normal speed travel of the pickup assembly.

Upon production of the control signal by the counter control circuit 128 the first input selector switch 152 is opened, and the second input selector switch 154 is closed. Then the counter proper 124' receives only the disc revolution pulses from the pulse frequency converter circuit 130. The counter proper converts these input pulses into the noted binary digital signal representative of the addresses of the successive turns of the information track 100 being traversed by the pickup assembly 26 at high or normal speed.

Figure 9:
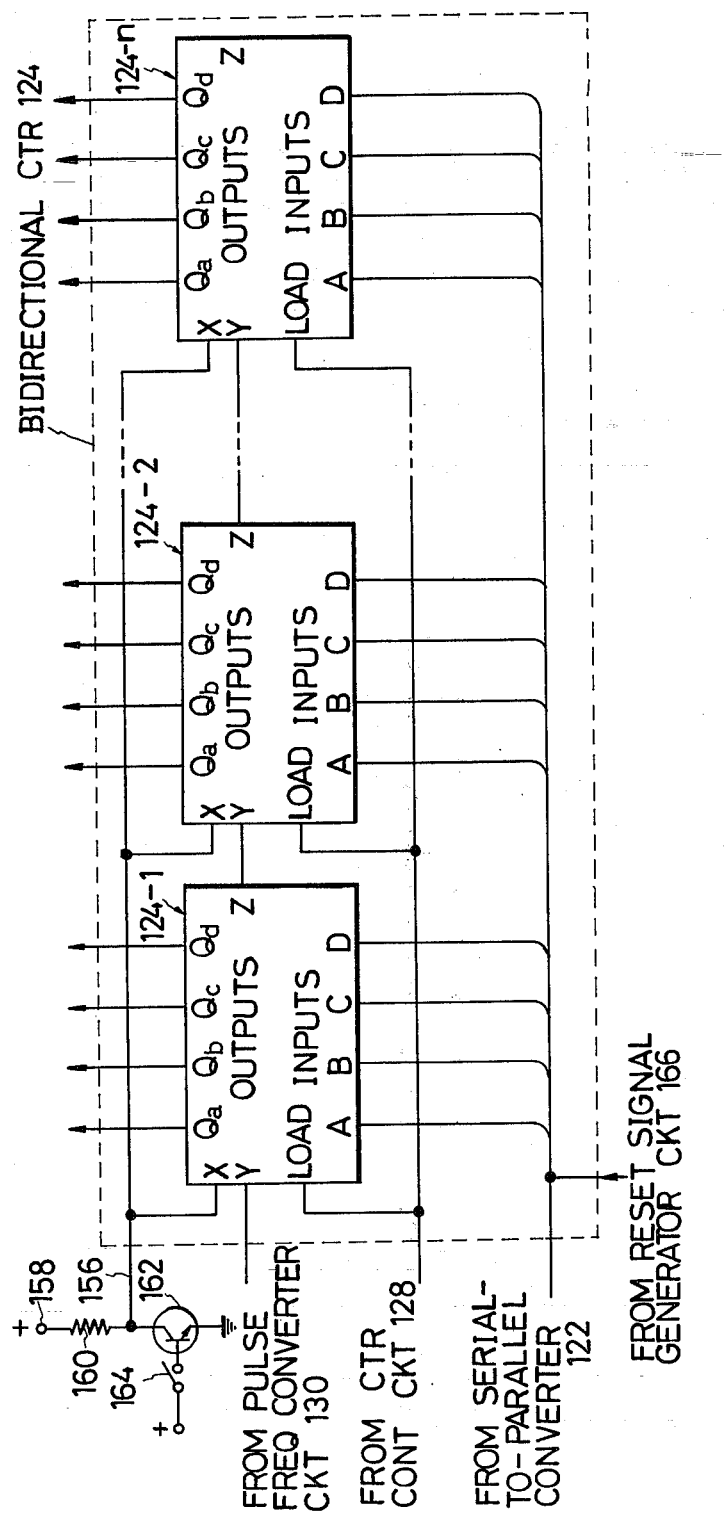
FIG. 9 is a schematic diagram of the bidirectional counter of FIG. 8, showing in particular the constituent units of the counter connected in cascade.
Figure 10:
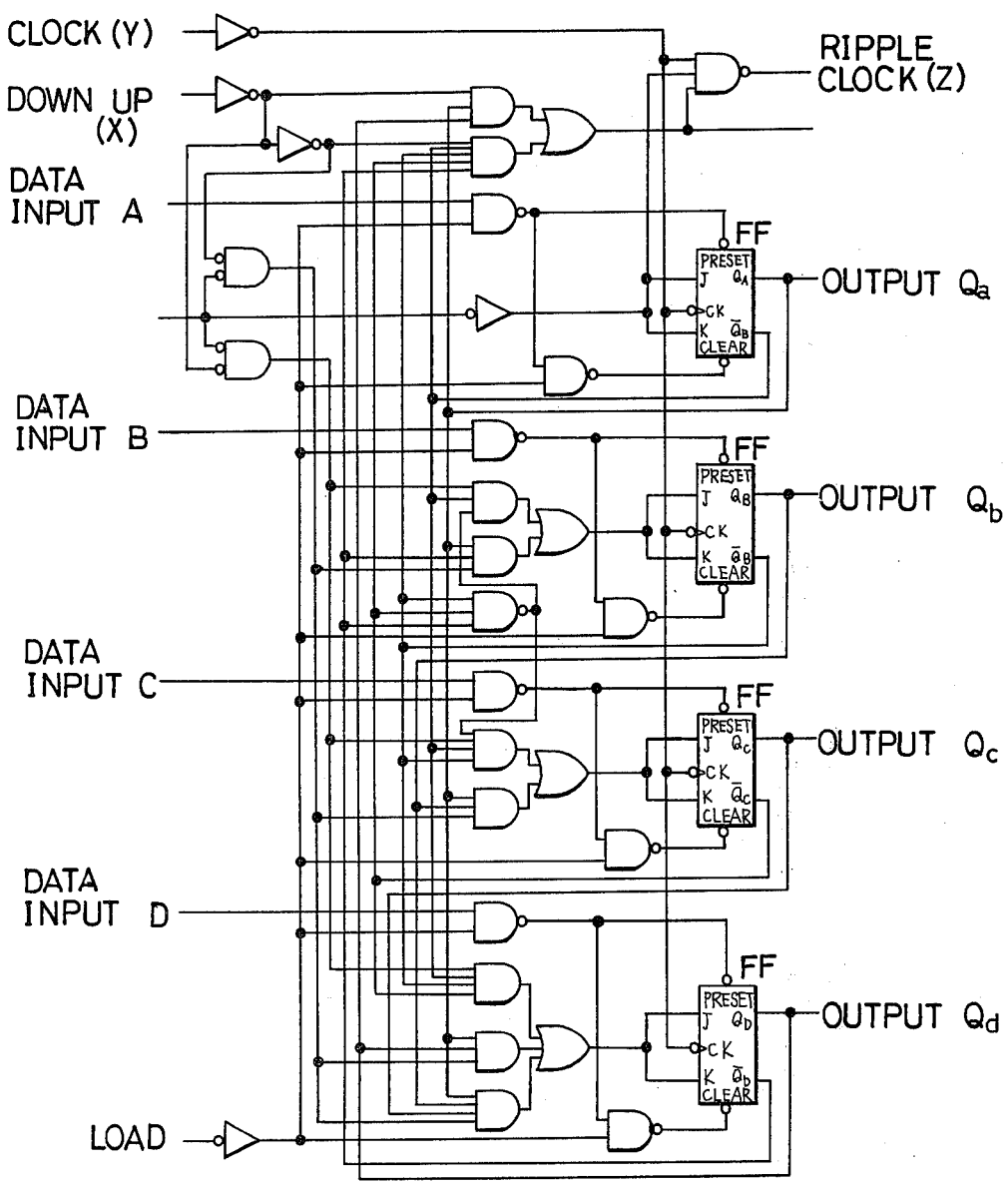
FIG. 10 is a detailed circuit diagram of one of the units of the bidirectional counter shown in FIG. 9.

FIG. 9 details an example of configuration which the bidirectional counter 124 may assume in practice. The bidirectional counter 124 comprises n bidirectional counter units 124-1, 124-2, . . . 124-n in cascade. Each of these counter units may take the form of the integrated circuit (IC) SN 74,190 manufactured by Texas Instruments, Inc., of the United States. FIG. 10 shows the detailed configuration of this IC. The following description of FIG. 9 may be read with due reference to FIG. 10.

The serial-to-parallel converter 122 is connected to the data input terminals A, B, C and D of each of the n counter units 124-1 through 124-n of the bidirectional counter 124. The counter control circuit 128 is connected to the control terminal, designated LOAD, of each counter unit. The pulse frequency converter circuit 130 is connected to the "clock" terminal Y of the first counter unit 124-1. Each of the second and subsequent counter units 124-2 through 124-n has its "clock" terminal Y connected to the "ripple clock" terminal Z of the preceding counter unit.

Further connected to the "up-down" terminal X of each of the counter units 124-1 through 124-n is a line 156 for the delivery of an input signal of high or low level depending upon the traveling direction of the pickup assembly 26. The input signal may be of high level, for example, when the pickup assembly 26 is traveling in the above defined forward direction, and of low level when the pickup assembly is traveling in the reverse direction. The input line 156 selectively delivers the high or low level input to the "up-down" terminals X of the counter units 124-1 through 124-n thereby conditioning same for addition (count-up) or subtraction (count-down).

The input line 156 is connected, on the one hand, to a supply terminal 158 via a resistor 160 and, on the other hand, to the collector of an NPN-type switching transistor 162. This switching transistor has its emitter grounded and its base connected to a switch 164. The switch 164 is assumed to be actuated in response to the conditioning of the radial feed motor 48 for rotation in a prescribed direction. The closure of the switch 164 results in the conduction of the switching transistor 162, so that the input line 156 assumes the ground potential.

A reset signal generator circuit 166, FIG. 1, is also connected to the input terminals A through D of all the counter units 124-1 through 124-n. Connected to the reset signal generator circuit 166 is a limit switch 168 which is arranged to be actuated by the unshown carriage of the pickup assembly 26 when the latter reaches the inmost position of the record disc 22 on the turntable 20. Upon actuation of the limit switch 168 the reset signal generator circuit 166 produces a logical zero output for resetting the counter units 124-1 through 124-n of the bidirectional counter 124.

Such being the exemplified configuration of the bidirectional counter 124, the counter units 124-1 through 124-n receive the track turn address signal from the serial-to-parallel converter circuit 122 through their input terminals A through D when no control signal is being applied to their LOAD control terminals from the counter control circuit 128. The input digital track turn address signal appears as such at the output terminals Qa, Qb, Qc and Qd of each counter unit. To turn this statement around is to say that the bidirectional counter 124 permits the passage therethrough of the track turn address signal during the normal speed travel of the pickup assembly 26.

Upon application of the control signal from the counter control circuit 128 to the control terminals of the counter units 124-1 through 124-n, these counter units count the disc revolution pulses delivered from the pulse frequency converter circuit 130. These input pulses are of course counted in either an increasing or decreasing direction depending upon the level of the input signal being applied to the "up-down" terminals X of the counter units, that is, upon the traveling direction of the pickup assembly 26. Upon receipt of each disc revolution pulse the bidirectional counter 124 puts out a digital signal substantially representing that address on the record disc 22 which corresponds to the position of the pickup assembly 26 relative to the disc.

Figure 11:
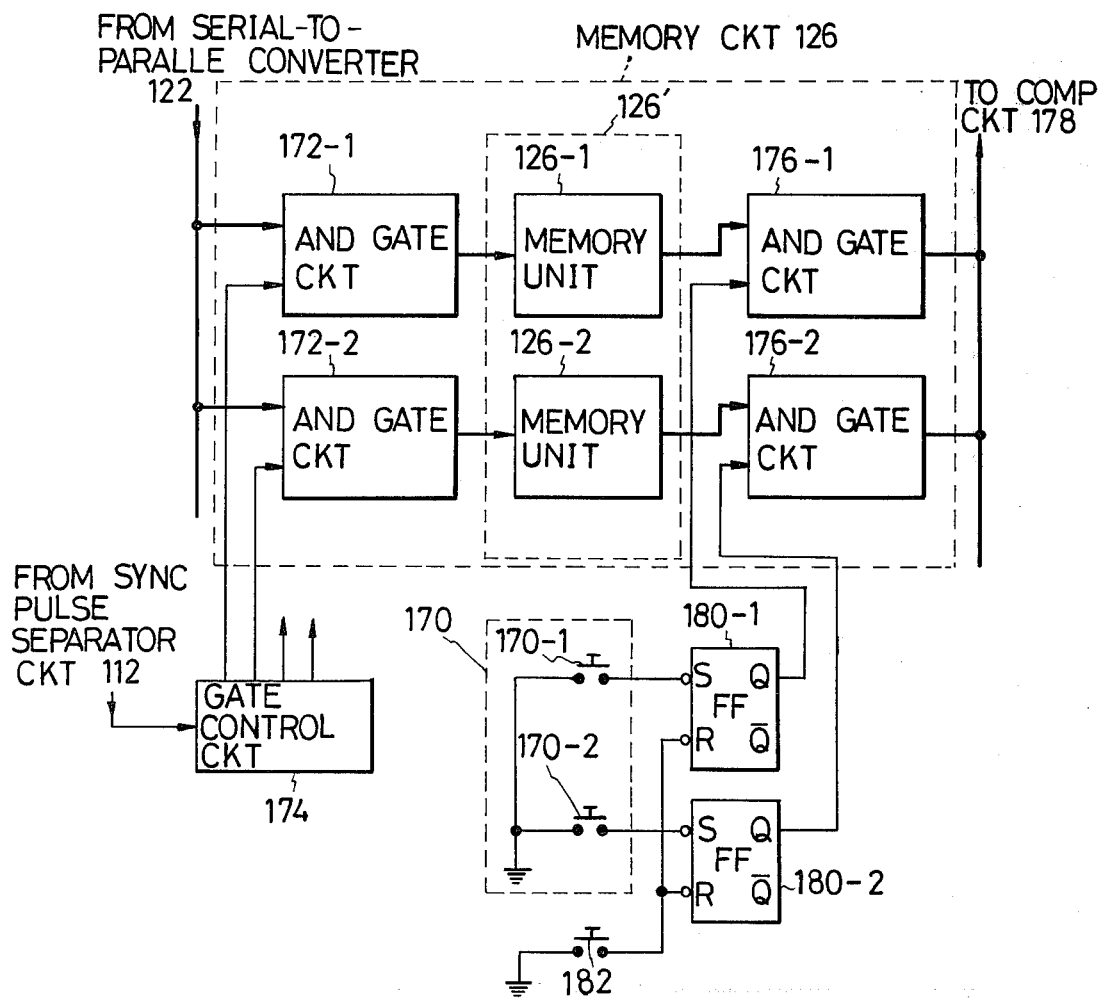
FIG. 11 is a block diagram explanatory of the functions of the memory circuit, memory control circuit, and information selector switch circuit in the disc player of FIG. 1.

FIG. 11 is a more detailed representation of the memory circuit 126, memory control circuit 132, and information selector switch circuit 170. The memory circuit 126 includes a memory proper 126' comprising a plurality of storage locations or memory units 126-1, 126-2, . . . The serial-to-parallel converter 122 is connected to the memory units 126-1, 126-2, . . . via respective AND gate circuits 172-1, 172-2, . . . Each of these AND gate circuits comprises a plurality of AND gates corresponding to the number of bits of the track turn address signal of parallel format put out by the serial-to-parallel converter 122.

A gate control circuit 174 is connected between the synchronizing pulse separator 112 and the other inputs of the AND gate circuits 172-1, 172-2, . . . During the reading of the address index to the information streams on the record disc 22 the pulse separator circuit 122 causes the gate control circuit 174 to deliver its output to the successive AND gate circuits 172-1, 172-2, . . . for the passage therethrough of the address index signal delivered from the serial-to-parallel converter 122.

More particularly, when the pickup assembly 26 reads the starting address of the first information stream in the address index on the record disc 22, the gate control circuit 174 causes conduction through the first AND gate circuit 172-1. The starting address of the first information stream in the address index is therefore written in the first memory unit 126-1. Likewise, when the pickup assembly 26 reads the starting address of the second information stream in the address index, the gate control circuit 174 causes conduction through the second AND gate circuit 172-2. The starting address of the second information stream is therefore written in the second memory unit 126-2.

Although FIG. 11 shows only two memory units or storage locations 126-1 and 126-2 of the memory 126 for brevity, it is of course understood that the memory comprises a plurality or multiplicity of such memory units in practice, together with the corresponding number of AND gate circuits 172-1, 172-2, . . . connected in their preceding stage. The starting addresses of a multiplicity of information streams on the record disc 22 can therefore be written respectively in such memory units 126-1, 126-2, . . . of the memory.

The AND gate circuits 172-1, 172-2, . . . become nonconductive upon completion of the reading of the address index from the record disc 22. Thus, although the serial-to-parallel converter 122 subsequently puts out the signal representing the successive track turn addresses on the record disc 22, this signal is no longer stored in the memory circuit 126.

The outputs of the memory units 126-1, 126-2, . . . are connected via respective AND gate circuits 176-1, 176-2, . . . to a comparator circuit 178. Each of these AND gate circuits 176-1, 176-2, . . . serves to deliver to the comparator circuit 178 the starting address of one of the information streams that has been written in the corresponding one of the memory units 126-1, 126-2, . . . , when the user selects that information stream for playback. The following description will make this function of the AND gate circuits clearer.

The information selector switch circuit 170 comprises a plurality or multiplicity of normally open switches 170-1, 170-2, . . . 170-n to be individually actuated by the user to select any one of the information streams he wants to be reproduced. These information selector switches 170-1, 170-2, . . . are connected to the set terminals S of respective flip-flops 180-1, 180-2, . . . and thence to the respective AND gate circuits 176-1, 176-2, . . . .

If the user wants the playback of the first information stream, for example, he may actuate the first information selector switch 170-1, which may be marked "1". The closure of the first information selector switch 170-1 results in the setting of the first flip-flop 180-1 and, consequently, in the conduction of the first AND gate circuit 176-1. Thereupon the starting address of the first information stream, which has been stored in the first memory unit 126-1, is delivered to the comparator circuit 178 via the first AND gate circuit 176-1.

The memory units 126-1, 126-2, . . . , AND gate circuits 172-1, 172-2, . . . , and AND gate circuits 176-1, 176-2, . . . of FIG. 11 may be considered to constitute in combination the memory circuit 126 of FIG. 1. Also the gate control circuit 174 and flip-flops 180-1, 180-2, . . . of FIG. 11 may be considered to constitute in combination the memory control circuit 132 of FIG. 1.

A reset switch 182, FIG. 11, is connected to the reset terminals R of all the flip-flops 180-1, 180-2, . . . . This reset switch is also to be manipulated by the user, when he wishes to cancel the selection of some information stream he has made. The actuation of the reset switch 182 results in the resetting of all the flip-flops 180-1, 180-2, . . . .

Reference is again directed back to FIG. 1. The comparator circuit 178 has its two inputs connected to the bidirectional counter 124 and to the memory circuit 126 for comparing the successive track turn addresses from the former with the starting address of the selected information stream from the latter. The output from the comparator circuit 178 is inverted upon agreement of its two inputs, that is, upon receipt of the starting address of the desired information stream from the bidirectional counter 124.

The output of the comparator circuit 178 is connected to a radial feed motor stop circuit 184 for stopping the rotation of the radial feed motor 48 upon agreement of the two inputs to the comparator circuit. The radial feed motor stop circuit 184 comprises a differentiating circuit 186 connected directly to the output of the comparator circuit 178, and an NPN-type switching transistor 188 having its base connected to the output of the differentiating circuit. The transistor 188 has its emitter grounded and its collector connected to the reset terminal R of the flip-flop 92 included in the radial feed motor control circuit 50. It will be recalled that the radial feed motor stop switch 96 is also connected to this reset terminal of the flip-flop 92.

Thus, in response to the inversion of the output from the comparator circuit 178, the differentiating circuit 186 produces its output to cause conduction through the transistor 188. The conduction of this transistor results in the resetting of the flip-flop 92. Since then the relay contact pair 84 in the feed circuit 52 of the radial feed motor 48 is opened, the radial feed motor is set out of rotation.

The output of the comparator circuit 178 is also connected to the base of another NPN-type switching transistor 190. The emitter of this transistor 190 is grounded, and its collector is connected to an LED 192, which in turn is connected to a positive supply terminal 194. Upon agreement of the two inputs to the comparator circuit 178, therefore, the transistor 190 conducts to cause the LED 192 to be lit up.

FIG. 1 further shows a binary-to-decimal converter 196 connected to the output of the bidirectional counter 124, and a display device 198 connected to the output of the converter. The display device 198 visually displays, on the decimal basis, the count being made by the bidirectional counter 124.

Operation

Although the operation of the video disc player embodying my invention is believed apparent from the foregoing description, further amplification will be made in the following brief summary of such operation. With the record disc 22 placed in position upon the turntable 20 and locked against displacement relative to the turntable by any suitable means, not shown, the user or operator may first actuate the first 56 and second 58 direction selector switches to move their movable contacts 60 and 66 into engagement with the fixed contacts 64 and 70 respectively. This conditions the radial feed motor 48 for rotation in the reverse direction. The user may further actuate the radial feed motor start switch 94 to close the relay contact pair 84.

Thereupon the optical pickup assembly 26 starts traveling rightwardly until, in the inmost position of the record disc 22 on the turntable 20, the unshown carriage of the pickup assembly actuates the limit switch 168.

Upon actuation of this limit switch the reset signal generator circuit 166 puts out the reset signal for resetting all the counter units 124-1 through 124-n of the bidirectional counter 124.

With the above preliminary steps completed the user may again actuate the direction selector switches 56 to 58 to move their movable contacts 60 and 66 back into engagement with the fixed contacts 62 and 68 as shown. This conditions the radial feed motor 48 for rotation in the forward direction. The movable contact 78 of the speed selector switch 72 is understood to be now engaged with the first fixed contact 80, also as shown, to cause the radial feed motor 48 to rotate at normal speed. It is further understood that the disc drive motor 24 is set in rotation in a prescribed direction simultaneously with the start of rotation of the radial feed motor 48. Thus the pickup assembly 26 starts scanning the record disc 22 along its spiral information track 100 with the laser beam 36.

The first or several foremost ones of the vertical retrace regions a through i of the information track 100 carry the digital address index to all the information streams recorded on the record disc 22, listing at least their starting addresses. The address detector circuit 114 detects this address index from the output from the demodulator circuit 108, and the starting addresses of the successive information streams are written in the respective memory units or storage locations 126-1, 126-2, . . . , FIG. 11, of the memory circuit 126.

Also detected by the address detector circuit 114 are the track turn addresses recorded in every other one of the vertical retrace regions of the information track 100. Since the pick-up assembly 26 is now traveling at normal speed, these track turn addresses are delivered to the bidirectional counter 124 via the serial-to-parallel converter 122.

As will be recalled by referring to FIG. 3, the initial length (e.g., from address 0 to address 99) of the information track 100 bears the visual index to the subsequently recorded information streams. The television receiver 110 receives and displays this visual index, which shows the matter to which each information stream pertains and, possibly, the serial numbers assigned to the successive information streams. The user may determine which one of the information streams he wants to play back, either by watching the visual index on the television screen or by consulting a printed index which may be prepared as an appendage to each record disc.

Upon completion of the playback of the visual index, and of the writing of the digital address index in the memory circuit 126, the user may actuate that one of the information selector switches 170-1 through 170-n which corresponds to the particular information stream he has chosen. If he wants the playback of the third information stream, for example, he may actuate the information selector switch marked "3". Thereupon the memory control circuit 132 causes the memory circuit 126 to deliver to the comparator circuit 178 the signal representative of the starting address of the third information stream to be retrieved.

For high speed access to the selected information stream the user may then actuate the speed selector switch 72 to move its movable contact 78 into engagement with the second fixed contact 82. Thereupon the radial feed motor 48 starts driving the pickup assembly 26 at high speed in the forward direction.

The engagement of the speed selector switch movable contact 78 with the second fixed contact 82 results also in the closure of the cutoff switch 120. Thus, upon consequent conduction of the switching transistor 116, the address detector circuit 114 becomes unable to detect the successive track turn addresses from the output from the demodulator circuit 108. Although the bidirectional counter 124 no longer receives the track turn addresses from the address detector circuit 114 via the serial-to-parallel converter 122, the counter control circuit 128 causes the counter to take in, instead, the disc revolution pulses from the pulse frequency converter circuit 130. Derived from the signal generated by the tachometer 134, each of the disc revolution pulses corresponds to one complete revolution of the record disc 22.

The bidirectional counter 124 counts the disc revolution pulses and, upon receipt of each disc revolution pulse, delivers to the comparator circuit 178 a digital output representing the addresses of the successive turns of the record track 100 being traversed by the pickup assembly 26 at high speed. During the readout of the visual index the bidirectional counter 124 has been receiving the track turn addresses (up to address 99 in this particular embodiment) from the address detector circuit 114. The bidirectional counter 124 of the configuration shown in FIGS. 9 and 10 is capable of producing the desired address-representing output by adding the successive input disc revolution pulses to the last received address. Upon receipt of the first of the disc revolution pulses, therefore, the bidirectional counter 124 adds this pulse to the last received address 99, for example, and produces the digital output representing address 100. Thus the address-representing output from the bidirectional counter 124 substantially corresponds to the varying position of the pickup assembly 26 relative to the record disc 22.

Upon agreement of the output from the bidirectional counter 124 and that from the memory circuit 126, the output from the comparator circuit 178 becomes inverted. Thereupon the radial feed motor stop circuit 184 responds to reset the flip-flop 92 of the radial feed motor control circuit 50 and hence to terminate the rotation of the radial feed motor 48. The pickup assembly 26 comes to a stop at the starting address of the desired information stream, ready to read out this information stream.

The user may again actuate the speed selector switch 72 to condition the radial feed motor 48 for rotation at normal speed and may further actuate the radial feed start switch 94 to set the radial feed motor in rotation at normal speed. Since the disc drive motor 24 is understood to start rotation simultaneously with the radial feed motor 48, the disc player now starts playing back the selected information stream, causing same to be displayed by the television receiver 110.

In the above described process of high speed access to the desired information stream, the pickup assembly 26 may not be positioned at the exact starting point of that information stream upon termination of the high speed rotation of the radial feed motor 48. This presents no serious problem, however. For the disc player permits the user to readily and accurately correct the position of the pickup assembly 26, through the following procedure.

Let it be supposed that the pickup assembly 26 has come to a stop some distance before the starting point of the desired information stream. In this case the user may cause the pickup assembly 26 to travel forwardly or outwardly of the record disc at normal speed. During the travel of the pickup assembly at normal speed the counter control circuit 128 allows the bidirectional counter 124 to receive the accurate track turn addresses from the address detector circuit 114 via the serial-to-parallel converter 122. The comparator circuit 178 compares the corresponding output from the counter 124 and the output from the memory circuit 126 and, upon agreement thereof, causes the radial feed motor stop circuit 184 to set the radial feed motor 48 out of rotation. The pickup assembly 26 is now positioned at the exact starting point of the desired information stream.

The pickup assembly 26 may also have come to a stop somewhere past the starting point of the desired information stream as a result of high speed access thereto. The user may then cause the pickup assembly 26 to travel a suitable distance in the reverse direction, past the starting point of the desired information stream, at high speed and then to travel forwardly at normal speed. The pickup assembly will then be positioned at the precise starting point of the desired information stream through the same procedure as in the first described case.

The illustrated disc player also permits access to any information stream with only the normal speed travel of the pickup assembly 26. For such normal speed access the pickup assembly may be fed forwardly at normal speed after the readout of the visual index and the storage of the digital address index in the memory circuit 126. During the normal speed travel of the pickup assembly 26 the bidirectional counter 124 accepts the accurate track turn addresses that have been derived from the demodulator output by the address detector circuit 114, rather than the disc revolution pulses from the pulse frequency converter circuit 130.

As in the above described case of high speed access the comparator circuit 178 compares the outputs from the bidirectional counter 124 and from the memory circuit 126 and, upon agreement thereof, causes the radial feed motor stop circuit 184 to stop the rotation of the radial feed motor 48. The pickup assembly 26 will then be positioned at the exact starting point of the desired information stream.

It is thus seen that the illustrated disc player is equipped with two different means for detecting the position of the pickup assembly 26 relative to the record disc 22. One of the detecting means comprises the demodulator circuit 108, the synchronizing pulse separator circuit 112, the address detector circuit 114, and the serial-to-parallel converter 122. The other detecting means comprises the tachometer 134, the wave-shaping circuit 136, and the pulse frequency converter circuit 130. Both detecting means share the bidirectional counter 124. Access to any desired information stream is possible with the use of either or both of the two different detecting means. The counter control circuit 128 performs the function of automatically switching between the two detecting means.

What follows is the description of the procedure for making access, immediately following the readout of some information stream, to another information stream. The user may first actuate the reset switch 182, FIG. 11, to cancel his previous selection of the information stream that has been being read out. The user may then actuate that one of the information selector switches 170-1 through 170-n which bears the serial number of the next information stream he wishes to play back, with the result that the memory circuit 126 delivers the starting address of the desired new information stream to the comparator circuit 178. This new information stream is assumed to be situated outwardly, on the record disc 22, of the information stream that has been being read out.

The user may proceed to actuate the speed selector switch 72 to condition the radial feed motor 48 for high speed rotation, particularly if the location of the desired new information stream is considerably distanced from that of the old information stream. The bidirectional counter 124 has been receiving the track turn addresses from the address detector circuit 114 during the readout of the old information stream. After the actuation of the speed selector switch 72 as above, that is, during the consequent high speed travel of the pickup assembly 26, the bidirectional counter 124 receives the disc revolution pulses from the pulse frequency converter circuit 130. The bidirectional counter 124 adds the disc revolution pulses to the last received track turn address to produce the desired address-representing output.

Consequently the output from the bidirectional counter 124 continues to represent the position of the pickup assembly 26 in the radial direction of the record disc 22 in spite of the noted change form normal to high speed travel of the pickup assembly. The comparator circuit 178 compares this counter output with the output from the memory circuit 126. Upon agreement of the two inputs the comparator circuit 178 causes the radial feed motor stop circuit 184 to stop the radial feed motor 48.

According to one of the features of the video disc player described in the foregoing, the digital address index to the information streams on the record disc 22 is first written in the memory circuit 126 with the start of playback of the record disc. This permits the user to gain ready access to any desired information stream merely by actuating one of the information selector switches 170-1 through 170-n. The record disc 22 further provides the visual index to the information streams, which will help the user to choose from among them and to know the serial number assigned to his choice.

Another feature of the illustrated disc player resides in the provision of the tachometer 134 and the associated circuits 130 and 136 for the indirect detection of the track turn addresses from the radial motion of the pickup assembly 26, in addition to the provision of the address detector circuit 114 for the direct detection of the track turn addresses from the record disc itself. Thus the disc player provides for high speed access to any desired information stream, besides normal speed access. The switching between the two inputs to the bidirectional counter 124, moreover, is automatically effected by the counter control circuit 128. The bidirectional counter 124 further permits access to a desired information stream even if, in the course of such access, the radial motion of the pickup assembly 26 is switched between normal and high speeds or between forward and reverse directions.

It is also to be noted that the reset signal generator circuit 166, operating in coaction with the limit switch 168, automatically resets the bidirectional counter 124 each time the pickup assembly 26 reaches the inmost position on the record disc 22. This helps to further simplify the process of the selective retrieval of the information streams.

Second Form

FIG. 12 illustrates my invention as adapted for a magnetic tape cassette record-playback apparatus (hereinafter referred to as the cassette player). Some parts of the illustrated cassette player have their exact counterparts in the disc player of FIG. 1. Like reference characters will be employed to identify such corresponding parts, and their description will be omitted except where necessary.

The cassette player of FIG. 12 is intended for use with a magnetic tape cassette 200 of the tape pull-out type, that is, one in which the magnetic tape 202 is pulled out from its phantom position within the cassette housing 204 to the solid line position for recording and playback. A brief explanation of this magnetic tape 202 will serve to make the subsequent description of the cassette player more understandable.

Figure 13:
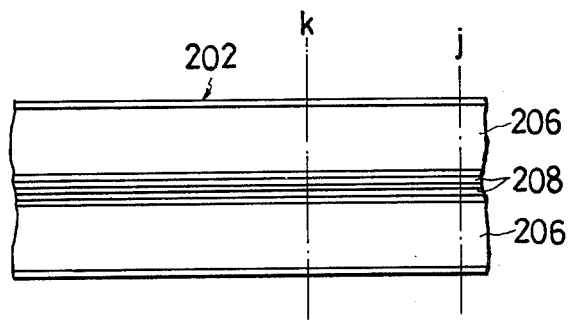
FIG. 13 is an enlarged, fragmentary view of the magnetic tape for use with the apparatus of FIG. 12.

With reference therefore to FIG. 13 the magnetic tape 202 is shown to be of two main tracks 206 for successively recording a plurality of multiplicity of audio information streams. Each main track 206 has an accompanying subtrack 208 of much smaller width extending alongside same for recording a series of addresses identifying successive preselected positions on the tape 202.

In the initial length of the tape 202, however, as from j to k in FIG. 13, the main track 206 contains an audibly reproducible index to the information streams prerecorded successively in the subsequent lengths of the tape. The subtrack 208 also contains in its initial length a digital address index to the information streams, sequentially listing at least their starting addresses. Also recorded in the subtrack 208, along with the series of addresses and the address index, are the synchronizing pulses similar to those shown in FIG. 4, for purposes self-evident from the foregoing description of the disc player of FIG. 1.

Thus, with the start of playback of the tape 202, the cassette player of FIG. 12 audibly reproduces the audio index to the information streams prerecorded subsequently on the tape. Simultaneously the address index to the information streams is written in the memory circuit 126 under the control of the memory control circuit 132, as in the disc player of FIG. 1.

As will be seen by referring again to FIG. 12, the magnetic tape 202 of the cassette 200 is wound on a pair of hubs or reels 210 and 212 within the housing 204. When mounted in position on the cassette player, the tape cassette 200 has its hubs 210 and 212 in positive driving engagement with respective drive spindles 214 and 216. A pair of movable guide pins 218 and 220 coact to pull the tape 202 out of the cassette housing 204 and into contact with a record-playback head 222 and an address detector head 224.

A capstan 226 is driven by a takeup motor 48a and coacts with a pinch roller 228 to frictionally feed the tape 202 forwardly, that is, from hub 212 to hub 210, at normal or low speed. For the "fast forwarding" of the tape 202 the takeup motor 48a drives the takeup hub 210 via the spindle 214 at high speed, and the tape travels along the phantom path within the cassette housing 204, out of contact with the record-playback head 222 and address detector head 224. For the rewinding of the tape 202 a rewind motor 232 drives the hub 212 via the spindle 216 at high speed, and the tape also travels along the phantom path.

The record-playback head 222 and address detector head 224 of this cassette player correspond in combination to the optical pickup assembly 26 of the disc player of FIG. 1. The takeup motor 48a and rewind motor 232 also correspond in combination to the radial feed motor 48, coacting with the disc drive motor 24, of the FIG. 1 disc player.

As the name implies, the address detector head 224 functions exclusively for picking up the address index to the prerecorded information streams and the addresses of the successive preselected tape positions from the subtracks 208 of the tape 202. The address detector head 224 is connected to the address detector circuit 114 and the associated circuits for processing the address index and address signals in the manner apparent from the description of the preceding embodiment.

The drive spindle 214 is provided with the tachometer 134, which is connected to a pulse frequency converter circuit 130a via the wave-shaping circuit 136. The pulse frequency converter circuit 130a puts out what may be termed tape travel pulses in response to the output pulses of the wave-shaping circuit 136. Since the tachometer 134 is associated with the drive spindle 214, its output frequency does not correspond to the actual tape speed because of the varying diameters of the tape coils on the hubs 210 and 212. The pulse frequency converter circuit 130a is constructed, however, to compensate for this nonlinear relationship between tape speed and tachometer output frequency, putting out the tape travel pulses with a repetition rate corresponding to the actual tape speed. These tape travel pulses substantially represent the address-bearing preselected positions on the tape 202.

Labeled 50a is a circuit for controlling the operation of the takeup motor 48a. The takeup motor control circuit 50a includes the pair of relay contacts 84 and the speed selector switch 72 connected in series between takeup motor 48a and supply terminal 76a. The relay contact pair 84 is actuated by the relay coil 86, which in turn is energized upon conduction of the switching transistor 90 associated with the flip-flop 92.

FIG. 12 further shows a rewind switch 234 connected to the rewind motor 232, and a sensing pole 168a for sensing the starting point of the tape 202 from a conductive foil attached thereto. Connected to the reset signal generator circuit 166, the sensing pole 168a performs the function of the limit switch 168 in the FIG. 1 disc player. The other details of construction of this cassette player are believed apparent from the showing of FIG. 12 and from the previous description of FIG. 1.

Operation of the Second Form

Upon closure of the rewind switch 234 the rewind motor 232 rotates to wind up the tape 202 on the hub 212 at high speed, until the conductive foil on the tape actuates the sensing pole 168a. A suitable control circuit, not shown, responds to the actuation of the sensing pole 168a to set the rewind motor 232 out of rotation. The reset signal generator circuit 166 also responds to reset the bidirectional counter 124. The cassette player is now ready to play back the tape 202 from its starting point, that is, from address 0.

The user may actuate the start switch 94 of the takeup motor control circuit 50a to start the playback of the tape 202. Upon actuation of this start switch a tape pull-out mechanism, not shown, responds to cause the pair of movable guide pins 218 and 220 to pull out the tape 202 from its phantom to solid line position. Further the pinch roller 228 frictionally engages the tape 202 between itself and the capstan 226. Shortly after the pullout of the tape 202 the relay contact pair 84 is closed to set the takeup motor 48a in rotation at normal speed, provided that the movable contact 78 of the speed selector switch 72 is engaged with the fixed contact 80 as shown.

With the start of playback the address detector head 224 picks up the address index to the information streams from the subtrack 208 of the tape 202. This address index is delivered to and stored in the memory circuit 126. The address detector head 224 also picks up the addresses of the successive preselected tape positions, for delivery to the bidirectional counter 124. Simultaneously the record-playback head 222 reads the audio index from the main tape track 206, for reproduction as audible sound by unshown means.

The user may select one of the prerecorded information streams he wants to play back, either by listening to the audio index or by referring to a printed index which may accompany each tape cassette. Upon completion of the playback of the audio index, and of the writing of the address index in the memory circuit 126, the user may actuate one of the information selector switches 170-1 through 170-n corresponding to his selection. Thereupon the memory control circuit 132 causes the memory circuit 126 to deliver to the comparator circuit 178 the starting address of the information stream to be retrieved.

For high speed access to the desired information stream the user may then actuate the "fast forward" switch, not shown, which is effective to cause the retraction of the tape 202 from its solid line to phantom position, out of contact with the record-playback head 222 and address detector head 224. The actuation of the "fast forward" switch results also in the engagement of the movable contact 78 of the speed selector switch 72 with the fixed contact 82. The takeup motor 48a is then set in rotation at high speed to start the fast forwarding of the tape 202.

The counter control circuit 128 causes the bidirectional counter 124 to receive the tape travel pulses from the pulse frequency converter circuit 130a during the high speed travel of the tape 202. The counter 124 adds each input tape travel pulse to the last of the tape position addresses it received from the serial-to-parallel converter 122 during the playback of the audio index to the information streams. The comparator circuit 178 receives from the counter 124 the digital signal representing the addresses of the successive preselected positions on the tape 202 being fed forwardly at high speed.

Upon agreement of the outputs from the bidirectional counter 124 and from the memory circuit 126 the comparator circuit 178 functions as in the preceding embodiment to cause the takeup motor stop circuit 184 to stop the high speed rotation of the takeup motor 230. The user is now ready to start the playback of the information stream he has chosen from its starting point.

In event the tape 202 has not been stopped at the exact starting point of the desired information stream, the user may make the necessary correction, in the manner apparent from the description of the FIG. 1 disc player. It is of course possible to make access to the desired information stream at normal speed only, especially if that information stream is located near the start of the tape. The other details of operation are also believed obvious from the description of the FIG. 1 disc player.

Modifications

Figure 14:
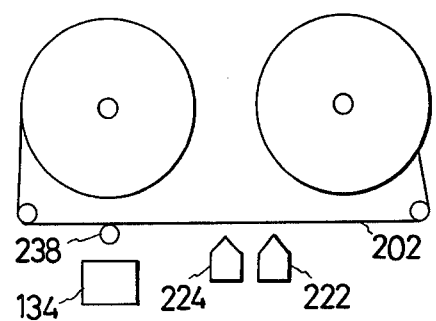
FIG. 14 is a schematic diagram of a modification of the apparatus of FIG. 12.

FIG. 14 shows a slight modification of the cassette player of FIG. 12. The modification features a speed sensing roller 238 arranged for frictional contact with the magnetic tape 202 during its high speed travel. Driven by this speed sensing roller 238, the tachometer 134 produces a sine wave output with a frequency corresponding to the actual tape speed, regardless of the varying diameters of the tape coils on the hubs 210 and 212 of the tape cassette.

Figure 15:
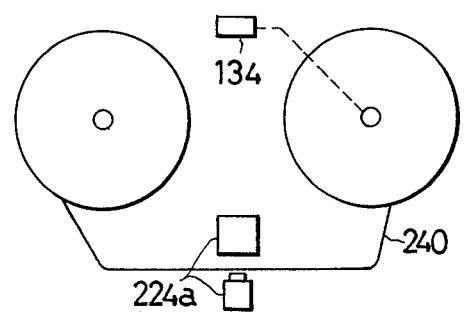
FIG. 15 is a schematic diagram of a microfilm reader to which my invention is applicable.
Figure 16:
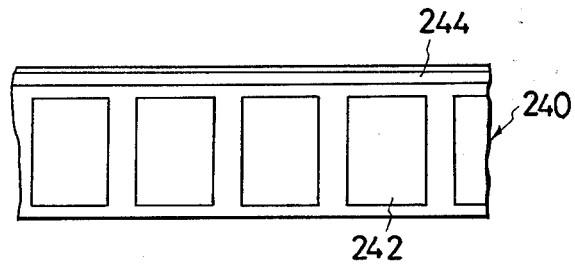
FIG. 16 is an enlarged, fragmentary view of the microfilm for use with the microfilm reader of FIG. 15.

My invention is further adaptable for a microfilm reader shown in FIG. 15. As pictured in FIG. 16, a microfilm 240 for use with the microfilm reader has recorded thereon a succession of items 242 of visually reproducible information, and the addresses of the information items are recorded in a subtrack 244 extending alongside the main track bearing the information items.

The microfilm reader of FIG. 15 includes an address detector 224a of any suitable construction for sensing the addresses of the information items 242 directly from the microfilm 240 traveling from reel to reel as shown. Also included is the tachometer 134 for generating a sine wave output to be processed into a train of pulses corresponding to the disc revolution pulses in the FIG. 1 disc player and to the tape travel pulses in the FIG. 12 cassette player. The other details of construction can be substantially identical with those shown in FIG. 12.

It will be recalled that in the embodiments of FIGS. 1 and 12, the output signal produced by the comparator circuit 178 upon agreement of its two inputs is utilized for setting the radial feed motor 48 or the takeup motor 48a out of rotation. As an alternative this comparator output signal may be utilized for switching the motor 48 or 48a from high to normal speed rotation, so that the playback of the selected information stream may be started automatically upon completion of high speed access thereto. FIG. 17 shows an example of motor control circuit embodying this alternative.

The motor control circuit 50b of FIG. 17 is, in fact, a modification of the radial feed motor control circuit 50 of FIG. 1. Included in this motor control circuit 50b is a relay coil 250 for actuating a relay contact set 72a comprising a movable contact 78a and two fixed contacts 80a and 82a. The relay contact set 72a corresponds to the speed selector switch 72 of FIGS. 1 and 12. The relay coil 250 has one of its extremities connected to a supply terminal 252 and the other extremity grounded via a switching transistor 254. Connected to the base of this switching transistor is the output of a flip-flop 256, which has its set terminal S grounded via a high speed switch 258 and its reset terminal R grounded via a normal speed switch 260. Instead of the speed selector switch 72 of FIGS. 1 and 12 the high speed switch 258 and the normal speed switch 260 are to be actuated individually to condition the motor 48 for rotation at high and normal speeds, respectively.

Also connected to the reset terminal R of the flip-flop 256 is the collector of another switching transistor 188a, which has its emitter grounded. The base of this transistor 188a is connected to the output of a differentiating circuit 186a and thence to the output of the comparator circuit 178. The transistor 188a and the differentiating circuit 186a constitute in combination a speed reduction circuit 184a which corresponds to and replaces the radial feed motor or takeup motor stop circuit 184 of FIGS. 1 and 12.

Thus, upon receipt of the output signal from the comparator circuit 178 as a result of high speed access to some selected information stream, the speed reduction circuit 184a resets the flip-flop 256 of the motor control circuit 50b. Thereupon the movable contact 78a of the relay contact set 72a is switched from fixed contact 82a to fixed contact 80a, the latter being connected to the drive amplifier 54 via the resistor 74. Thus the apparatus automatically starts the playback of the selected information stream after locating its starting point at high speed.

FIGS. 18 and 19 show a modification of the tachometer 134 of FIGS. 4, 5 and 6. Intended for use in the disc player of FIG. 1, the modified tachometer 134a includes a stationary, slitted strip 142a extending radially of the record disc 22 on the turntable 20, parallel to the guide rail or rails 38, and having a multiplicity of slits 150a formed therein at constant spacings. The tachometer 134a further comprises a movable, slitted plate 138a also having slits 148a formed therein, the LED 144, and the phototransistor 146, which are all mounted on the unshown carriage of the pickup assembly 26. The LED 144 and the phototransistor 146 are disposed on the opposite sides of the slitted strip 142a and slitted plate 138a.

With the radial motion of the pickup assembly 26, therefore, the slits 148a in the plate 138a move into registration with the successive slits 150a in the stationary strip 142i a. Since the LED 144 irradiates the phototransistor 146 through the successive stationary strip slits 150a as they register with the moving plate slits 148a, the phototransistor produces the desired sine wave output at a frequency corresponding to the traveling speed of the pickup assembly 26.

The pulse frequency converter circuit 130 may not necessarily be a frequency multiplier. A frequency divider will be required if in the disc player of FIG. 1, for example, the output frequency of the tachometer 134 is higher than the rate at which the pickup assembly 26 traverses the successive turns of the information track 100 on the record disc 22. The pulse frequency converter circuit is of course unnecessary if the tachometer output frequency equals the rate at which the pickup assembly traverses the track turns.

Further, in the various embodiments and their modifications disclosed herein, the digital address indexes recorded on the record media (i.e., the record disc, magnetic tape, etc.) list merely the starting addresses of the information streams or items. Alternatively the address index may include instructions along with the starting addresses of the information streams or items, with the instructions being utilized to control the writing of the listed starting addresses in the memory circuit 126. As an additional alternative the address index may list not only the starting but also the ending addresses of the information streams. The ending address of each information stream may be used for automatically stopping the operation of the apparatus upon completion of the readout of that information stream.

The radial feed mechanism 40 of the illustrated disc player is also open to a variety of modifications. Instead of the endless wire drive there may be employed, for example, a motor-driven feed screw in engagement with an internally threaded member secured to the carriage of the pickup assembly. It is to be understood, however, that the pickup assembly may not necessarily be fed in the radial direction of the record disc to scan the spiral information track thereon. This objective could be accomplished by both rotating the record disc about its own axis and simultaneously feeding same linearly relative to the pickup assembly, the latter being held stationary in this case.

Still further, while the bidirectional counter 124 of the illustrated embodiments is reset by the digital zero signal delivered to the input terminals of its constituent units, there could of course be employed a counter having reset or clear terminals designed exclusively for that purpose.

Further yet, it will be understood that the video disc player, audio cassette player and other devices herein disclosed have been chosen merely to illustrate my invention. The invention is applicable to various other devices such as audio disc players and video tape players.

All these and other modifications, variations and adaptations that will readily occur to those skilled in the art are intended in the foregoing disclosure. It is therefore appropriate that my invention be construed broadly and in a manner consistent with the fair meaning or proper scope of the following claims.

I claim:

1. Apparatus for selectively retrieving a plurality of recorded information streams or items, comprising:
   (a) a record medium having a succession of information streams or items recorded along at least one track thereon and also having recorded thereon a series of addresses identifying successive preselected positions on the track, the record medium having further recorded thereon an index to the recorded information streams or items, with the index listing at least the starting addresses of the information streams or items and being recorded prior to the information streams or items;
   (b) means for reading the record medium;
   (c) means for creating a relative motion between the record medium and the reading means at a selected one of normal and high speeds;
   (d) means for storing the index read from the record medium by the reading means;
   (e) a plurality of information selector switches to be actuated manually for selecting for playback any of the recorded information streams or items on the basis of serial numbers assigned thereto in conformity with their locations on the record medium;
   (f) means responsive to the actuation of any of the information selector switches for causing the storing means to put out a signal representative of the location of the selected information stream or item on the record medium;
   (g) means for detecting the relative positional relationship between the record medium and the reading means, the detecting means comprising:
      (1) first means for deriving the address-representing output signal from the addresses read from the record medium by the reading means;
      (2) second means for deriving the address-representing output signal from the relative motion between the record medium and the reading means; and
      (3) selecting means for selecting the address-representing output signal derived by the first deriving means when the speed of the relative motion between the record medium and the reading means is normal, and for selecting the address-representing output signal derived by the second deriving means when the speed of the relative motion between the record medium and the reading means is high;

(h) means for comparing the output signals from the storing means and from the producing means, the comparing means putting out a signal upon agreement of the two input signals; and (i) means responsive to the output signal from the comparing means for controlling the creating means to cause the reading means to read out only the selected information stream or item.

2. The apparatus as recited in claim 1, wherein the second deriving means comprises:

(a) means for generating a train of pulses at a repetition rate corresponding to the speed of the relative motion between the record medium and the reading means; and (b) a bidirectional counter for counting the pulses generated by the generating means.

3. An optical disc player permitting ready access to any desired one of a plurality of recorded information streams, comprising:

(a) a record disc having a plurality of information streams recorded successively along a spiral track thereon and also having recorded thereon a series of addresses identifying successive preselected positions on the track, the record disc having further recorded thereon an address index to the recorded information streams, with the address index listing at least the starting addresses of the successive information streams and being recorded prior to the information streams;

(b) means for rotating the record disc about its own axis;

(c) an optical pickup assembly for reading the record disc;

(d) a radial feed mechanism for feeding the pickup assembly in the radial direction of the record disc to enable the pickup assembly to follow the track on the record disc as the latter is rotated, the radial feed mechanism including a radial feed motor;

(e) a radial feed motor control circuit for controlling the radial feed motor, the radial feed motor control circuit being capable of causing the radial feed mechanism to feed the pickup assembly at a selected one of normal and high speeds;

(f) a memory for storing the address index read from the record disc by the pickup assembly, the memory having a plurality of storage locations for storing respectively the starting addresses of the information streams on the record disc;

(g) a plurality of information selector switches to be actuated individually to select any one of the information streams on the record disc to be reproduced;

(h) a memory control circuit responsive to the actuation of any one of the information selector switches for causing the memory to produce an output signal representing the starting address of the selected information stream from its storage location;

(i) means for detecting the relative positional relationship between the record disc and the pickup assembly, the detecting means producing an output signal representing that address on the record disc which corresponds to the position of the pickup assembly relative to the record disc, the detecting means comprising:

(1) first means for deriving the address-representing output signal from the addresses read from the record disc by the pickup assembly;

(2) second means for deriving the address-representing output signal from the radial motion of the pickup assembly relative to the record disc; and (3) means for producing the address-representing output signal derived by the first deriving means when the pickup assembly is being fed at normal speed and for producing the address-representing output signal derived by the second deriving means when the pickup assembly is being fed at high speed;

(j) a comparator circuit for comparing the output signals from the memory and from the detecting means, the comparator circuit producing an output signal upon agreement of the two input signals; and (k) means for controlling the radial feed motor control circuit in response to the output signal from the comparator circuit.

4. The disc player as recited in claim 3, wherein the record disc is a video disc having the information streams recorded in the form of a composite picture signal, the record disc having the address index recorded in at least one of vertical retrace regions in the track.

5. The disc player as recited in claim 4, wherein the record disc has further recorded in an initial length of the track a visually reproducible index to the information streams.

6. The disc player as recited in claims 4 or 5, wherein the series of addresses are each recorded in one vertical retrace region in each turn of the spiral track on the record disc.

7. The disc player as recited in claim 3, wherein the controlling means is effective to cause the radial feed motor control circuit to stop the rotation of the radial feed motor in response to the output signal from the comparator circuit.

8. The disc player as recited in claim 3, wherein the controlling means is effective to cause the radial feed motor control circuit to change the speed of rotation of the radial feed motor from high to normal speed in response to the output signal from the comparator circuit.

9. Magnetic tape cassette apparatus permitting ready access to any desired one of a plurality of recorded information streams, comprising:

(a) a magnetic tape cassette including a pair of hubs and a length of magnetic tape wound thereon and extending therebetween, the magnetic tape having recorded thereon a succession of information streams and a series of addresses identifying successive preselected positions on the tape, the tape having further recorded thereon an address index to the recorded information streams, with the address index listing at least the starting addresses of the successive information streams and being recorded prior to the information streams;

(b) means for transporting the tape from hub to hub of the tape cassette, the transporting means including a takeup motor for transporting the tape at least in a prescribed forward direction;

(c) a takeup motor control circuit for controlling the takeup motor, the takeup motor control circuit being capable of causing the transporting means to transport the tape at a selected one of normal and high speeds;
(d) means for reading the tape;
(e) a memory for storing the address index read from the tape by the reading means, the memory having a plurality of storage locations for storing respectively the starting addresses of the information streams on the tape;
(f) a plurality of information selector switches to be actuated individually to select any one of the information streams to be retrieved from the tape;
(g) a memory control circuit responsive to the actuation of any one of the information selector switches for causing the memory to produce an output signal representative of the starting address of the selected information stream from its storage location;
(h) means for detecting the relative positional relationship between the tape and the reading means, the detecting means producing an output signal representing that address on the tape which corresponds to the tape position relative to the reading means, the detecting means comprising:
  (1) first means for deriving the address-representing output signal from the addresses read from the tape by the reading means;
  (2) second means for deriving the address-representing output signal from the travel of the tape relative to the reading means; and
  (3) means for producing the address-representing output signal derived by the first deriving means when the tape is being transported at normal speed and for producing the address-representing output signal derived by the second deriving means when the tape is being transported at high speed;
(i) a comparator circuit for comparing the output signals from the memory and from the detecting means, the comparator circuit producing an output signal upon agreement of the two input signals; and
(j) means for controlling the takeup motor control circuit in response to the output signal from the comparator circuit.

10. The magnetic tape cassette apparatus as recited in claim 9, wherein the magnetic tape has at least one main track along which the succession of information streams is recorded, and a subtrack which extends alongside the main track and along which the address index and the series of addresses are recorded.

11. The magnetic tape cassette apparatus as recited in claim 10, wherein the tape has further recorded in an initial length of the main track an audibly reproducible index to the information streams.

12. The magnetic tape cassette apparatus as recited in claim 10, wherein the reading means comprises:
  (a) a first magnetic head for reading the main track of the tape; and
  (b) a second magnetic head for reading the subtrack of the tape.

* * * * *